United States Patent [19]

Bott et al.

[11] Patent Number: 4,612,392

[45] Date of Patent: Sep. 16, 1986

[54] N-SUBSTITUTED ACRYLAMIDE AND METHACRYLAMIDE DERIVATIVES AND THEIR PREPARATION

[75] Inventors: Kaspar Bott, Wachenheim; Erich Penzel, Ludwigshafen; Guenter Eckert, Limburgerhof, all of Fed. Rep. of Germany

[73] Assignee: Basf Aktiengesellschaft, Rheinland-Pfalz, Fed. Rep. of Germany

[21] Appl. No.: 469,751

[22] Filed: Feb. 25, 1983

[30] Foreign Application Priority Data

Mar. 2, 1982 [DE] Fed. Rep. of Germany ....... 3207396

[51] Int. Cl.$^4$ .......................................... C07C 103/133
[52] U.S. Cl. .................................................. 564/207
[58] Field of Search ........................ 564/204, 207, 208

[56] References Cited

U.S. PATENT DOCUMENTS

| | | | |
|---|---|---|---|
| 2,704,762 | 3/1955 | Kendall et al. | 564/204 X |
| 3,225,093 | 12/1965 | Krapcho | 564/207 X |
| 3,433,835 | 3/1969 | Muller et al. | 564/207 |
| 3,776,956 | 12/1973 | Yamane et al. | 564/207 X |
| 3,780,103 | 12/1973 | Knell | 564/207 X |
| 4,014,679 | 3/1977 | Perronnet et al. | 564/207 X |
| 4,130,702 | 12/1978 | Choe | 526/93 |
| 4,281,192 | 7/1981 | Jacquet et al. | 564/207 |

FOREIGN PATENT DOCUMENTS 0067080 12/1982 European Pat. Off. .

Primary Examiner—Robert V. Hines
Attorney, Agent, or Firm—Oblon, Fisher, Spivak, McClelland & Maier

[57] ABSTRACT

N-substituted acrylamide or methacrylamide derivatives of the general formula

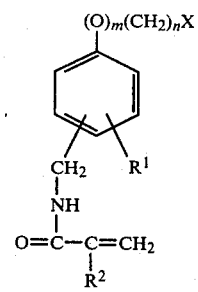

where m is 0 or 1, n is 1, 2, 3 or 4, n−m is 1, 2, 3 or 4, X is Br or Cl, and $R^1$ and $R^2$ are each $CH_3$ or H, are prepared by reacting an aromatic haloalkyl compound with N-methylolacrylamide or N-methylolmethacrylamide in the presence of a strong acid.

11 Claims, No Drawings

N-SUBSTITUTED ACRYLAMIDE AND METHACRYLAMIDE DERIVATIVES AND THEIR PREPARATION

Where polymers are prepared by polymerization of olefinically unsaturated monomers, it is advantageous in some cases to employ small amounts of monoolefinically unsaturated monomers which, in addition to the olefinic double bond, possess other reactive groups, for example haloalkyl groups. If such monoolefinically unsaturated monomers with reactive groups are incorporated as copolymerized units, it is possible to obtain products which, for example, can be readily cross-linked, or can be reacted with those low molecular weight substances which would interfere in a polymerization.

An example of a monoolefinically unsaturated monomer with a reactive group is p-chloromethylstyrene. However, particular difficulties are encountered in the industrial synthesis of this compound, since, owing to the occurrence of side reactions, neither simple chloromethylation of styrene nor chlorination of the side chain in methylstyrene is economical industrially.

It is an object of the present invention to prepare, in a simple manner, monoolefinically unsaturated monomers which possess a haloalkyl group.

We have found that this object is achieved in accordance with the present invention, and that N-substituted acrylamide or methacrylamide derivatives of the general formula

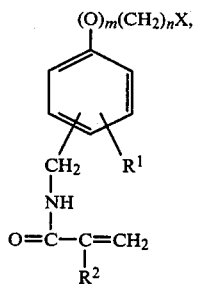

where m is 0 or 1, n is 1, 2, 3 or 4, n−m is 1, 2, 3 or 4, X is Br or Cl, and $R^1$ and $R^2$ are each $CH_3$ or H, can be prepared in a simple manner if an aromatic haloalkyl compound of the general formula II

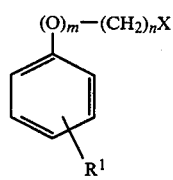

where m is 0 or 1, n is 1, 2, 3 or 4, n−m is 1, 2, 3 or 4, X is Br or Cl and $R^1$ is $CH_3$ or H, is reacted with N-methylolacrylamide or N-methylolmethacrylamide in the presence of a strong acid. The N-substituted acrylamide and methacrylamide derivatives of the general formula I are novel. The aromatic haloalkyl compounds of the general formula II which are used as starting materials are known.

Suitable strong acids for the novel preparation process are, in particular, sulfuric acid as well as aliphatic and aromatic sulfonic acids, in particular p-toluenesulfonic acid and methanesulfonic acid. Other suitable acids are those whose acidity is similar to that of sulfuric acid.

If the reaction is carried out in the presence of sulfuric acid, it is possible to dilute this with from 1 to 50% by weight, based on the total mixture, of acetic acid or water, and hence to influence the reaction so that elimination of halogen as hydrogen halide during the reaction is virtually ruled out. A hydrogen halide elimination of this type occurs principally in the case of those compounds in which the halogen is in the benzyl position (compounds of the general formula II where m is 0 and n is 1). In general, sulfuric acid is employed in a concentration of not less than 50, preferably from 60 to 80, % by weight, and preferably contains from 20 to 40% by weight of acetic acid.

In the reaction according to the invention, from 0.5 to 1.5, preferably from 0.8 to 1.2, moles of the aromatic haloalkyl compound II are employed per mole of N-methylolacrylamide or N-methylolmethacrylamide. The reaction can be carried out at room temperature, in general at from 5° to 25° C., preferably at from 10° to 20° C. Particularly in the preparation of those N-substituted acrylamide or methacrylamide derivatives of the general formula I in which m is 0 and n is 1, it has proved useful first to introduce N-methylolacrylamide or N-methylolmethacrylamide into a vessel which initially contains only the strong acid, and thereafter to add the aromatic haloalkyl compound of the general formula II, where m is 0 and n is 1, only at in general from 5° to 15° C., in particular from 5° to 10° C.

In the process according to the invention, the novel N-substituted acrylamide and methacrylamide derivatives of the general formula I are obtained in general in yields of from 50 to 80 mole %, based on the amount of acrylamide or methacrylamide derivative employed. These can be precipitated from the reaction mixture with hydrolysis, for example by adding ice or ice water in an amount which is in most cases from 2 to 6, in particular from 3 to 5, times as large as that of the reaction mixture. The precipitated N-substituted acrylamide or methacrylamide derivative contains in general only small amounts of impurities, in most cases below 5–10% by weight. It can be purified, for example, by recrystallization using ethyl acetate or an alcohol/water mixture, or by stirring thoroughly with cyclohexane. The impurities which occur are the conventional isomeric compounds, and for most intended uses these do not need to be separated off.

In comparison with alkyl acrylates, the novel N-substituted acrylamide and methacrylamide derivatives of the general formula I are substantially more stable to hydrolysis. They undergo polymerization very readily, and, in the copolymerization with other olefinically unsaturated monomers, they surprisingly exhibit a higher polymerization velocity than corresponding vinyl ethers or vinyl esters with haloalkyl groups. The novel N-substituted acrylamide and methacrylamide derivatives of the general formula I in general have virtually no irritant effect on mucous membranes. This is surprising, since, for example, the compounds II in which m is 0 and n is 1 have a pronounced irritant effect.

The literature (Reviews: H. E. Zaugg and W. B. Martin in Org. Rec., 14 (1952), 52 et seq. and H. E. Zaugg in Synthesis 1970, page 49 et seq.) discloses that the Tscherniac-Einhorn reaction of an N-hydroxymethylcarboxamide with an aromatic compound can be used to introduce an amidomethyl group into a benzene nucleus, and that in general a strong acid, in particular sulfuric acid, should be employed as a condensing agent in this procedure. However, strong acids, such as sulfuric acid, effect heterolytic elimination of halogen from benzyl halides, so that it was not to be expected that it would be possible to prepare an N-substituted acrylamide or methacrylamide derivative of the general formula I in adequate yield by converting an aromatic haloalkyl compound of the general formula II in a strong acid according to the present invention.

In the Examples which follow, parts are by weight. Parts by volume bear the same relation to parts by weight as that of the liter to the kilogram. The structures of the novel compounds prepared according to the Examples below have been established by elementary analysis and proton resonance spectra.

EXAMPLE 1

(p-Acrylamidomethylbenzyl bromide)

208 parts (2.06 moles) of N-methylolacrylamide are introduced into a stirred mixture of 700 parts by volume of 98% strength sulfuric acid and 300 parts by volume of glacial acetic acid at 15° C., while cooling with ice water. 342 parts (2 moles) of benzyl bromide are added, a little at a time, at this temperature, and the reaction mixture is then stirred for a further 20 hours at from 15° to 22° C. 50,000 parts of finely crushed ice are then added, and the precipitated crude product is filtered off, washed with water and dried in the air to give 378 parts (yield: 74%) of crude product, which is recrystallized from ethyl acetate to give pure p-acrylamidomethylbenzyl bromide of melting point 167° C.

EXAMPLE 2

(p-Acrylamidomethylphenethyl chloride)

70 parts (0.5 mole) of phenethyl chloride and 51.5 parts (0.51 mole) of N-methylolacrylamide are stirred, in succession, into 300 parts by volume of methanesulfonic acid which has been cooled to 15° C. Stirring is continued for 6 hours at from 15° to 20° C., and hydrolysis is effected by adding 1,500 parts of crushed ice. After the ice has thawed, the product is filtered off and dried in the air to give 84 parts (yield: 75%) of crude p-acrylamidomethylphenethyl chloride, which is recrystallized from methyl alcohol to give a pure product of melting point 145°–147° C.

EXAMPLE 3

(3-Acrylamidomethyl-p-xylyl chloride)

51.5 parts (0.51 mole) of N-methylolacrylamide and thereafter 70 parts (0.5 mole) of p-xylyl chloride are added to a mixture of 336 parts of 98% strength sulfuric acid and 164 parts of glacial acetic acid at 15° C., while cooling. Stirring is continued for 7 hours at from 15° to 20° C., after which 2,500 parts of finely crushed ice are added. After the ice has thawed, the crude product is freed from unreacted p-xylyl chloride by being washed with petroleum ether. 70.5 parts (crude yield: 63%) of 3-acrylamidomethyl-p-xylyl chloride are obtained. This is recrystallized from ethyl acetate to give a pure product of melting point 151° C.

EXAMPLE 4

(3-Methacrylamidomethyl-p-xylyl chloride)

60 parts (0.52 mole) of N-methylolmethacrylamide are reacted with 70 parts of p-xylyl chloride by a procedure similar to that described in Example 3. The product is washed with petroleum ether, and 59 parts (crude yield: 50%) of 3-methacrylamidomethyl-p-xylyl chloride are obtained. This crude product is suspended in diethyl ether, and the suspension is stirred at room temperature and filtered to give pure 3-methacrylamidomethyl-p-xylyl chloride of melting point 81°–83° C.

EXAMPLE 5

(p-Acrylamidomethyl-0-(2-bromoethyl)-phenol)

101 parts (1 mole) of N-methylolacrylamide are added to a solution of 201 parts (1 mole) of 0-(2-bromoethyl)-phenol in 1,200 parts by volume of methanesulfonic acid, and the mixture is then stirred for 3 hours at 20° C. The crude product is then precipitated with finely crushed ice, filtered off, suspended in petroleum ether and filtered off again to give 193 parts (crude yield: 80%, based on 0-(2-bromoethyl)-phenol converted) of crude p-acrylamidomethyl-0-(2-bromoethyl)-phenol, which is recrystallized from a 2:1 mixture of cyclohexane and ethanol to give pure p-acrylamidomethyl-0-(2-bromoethyl)-phenol of melting point 125° C. 30 parts of unreacted 0-(2-bromoethyl)-phenol are recovered from the petroleum ether filtrate.

We claim:

1. An N-substituted acrylamide or methacrylamide derivative of the formula I

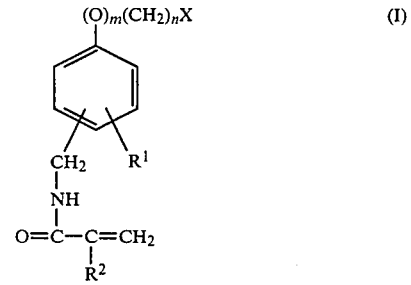

where m is 0 or 1, n is 1, 2, 3 or 4, n−m is 1, 2, 3 or 4, X is Br or Cl and $R^1$ and $R^2$ are each $CH_3$ or H.

2. The derivative of claim 1, wherein said derivative is p-acrylamidomethylbenzyl bromide.
3. The derivative of claim 1, wherein said derivative is p-acrylamidomethylbenzyl chloride.
4. The derivative of claim 1, wherein said derivative is p-acrylamidomethylphenethyl chloride.
5. The derivative of claim 1, wherein said derivative is p-acrylamidomethylphenethyl bromide.
6. The derivative of claim 1, wherein said derivative is 3-acrylamidomethyl-p-xylyl chloride.
7. The derivative of claim 1, wherein said derivative is 3-acrylamidomethyl-p-xylyl bromide.
8. The derivative of claim 1, wherein said derivative is 3-methacrylamidomethyl-p-xylyl chloride.
9. The derivative of claim 1, wherein said derivative is 3-methacrylamidomethyl-p-xylyl bromide.
10. The derivative of claim 1, wherein said derivative is p-acrylamidomethyl-0-(2-bromethyl)-phenol.
11. The derivative of claim 1, wherein said derivative is p-acrylamidomethyl-0-(2-chloroethyl)-phenol.

* * * * *